(12) United States Patent
Anderson

(10) Patent No.: US 9,317,503 B2
(45) Date of Patent: Apr. 19, 2016

(54) SYSTEM AND METHOD FOR NAMING AN IMAGE FILE

(71) Applicant: ID Integration, Inc., Multikeo, WA (US)

(72) Inventor: Gene Anderson, Seattle, WA (US)

(73) Assignee: ID Integration, Inc., Mukilteo, WA (US)

( * ) Notice: Subject to any disclaimer, the term of this patent is extended or adjusted under 35 U.S.C. 154(b) by 66 days.

(21) Appl. No.: 14/214,096

(22) Filed: Mar. 14, 2014

(65) Prior Publication Data

US 2014/0267832 A1  Sep. 18, 2014

Related U.S. Application Data

(60) Provisional application No. 61/794,593, filed on Mar. 15, 2013.

(51) Int. Cl.
*H04N 1/21* (2006.01)
*G06F 17/30* (2006.01)
*G06K 7/00* (2006.01)

(52) U.S. Cl.
CPC *G06F 17/30* (2013.01); *G06K 7/00* (2013.01); *H04N 1/2112* (2013.01)

(58) Field of Classification Search
CPC ..... H04N 1/21; H04N 1/2104; H04N 1/2108; H04N 1/2112; H04N 1/2116; H04N 1/215; H04N 5/907
See application file for complete search history.

(56) References Cited

U.S. PATENT DOCUMENTS

| | | | | |
|---|---|---|---|---|
| 7,221,399 | B2 * | 5/2007 | Fujita et al. | 348/340 |
| 7,232,072 | B1 * | 6/2007 | Bunte et al. | 235/462.45 |
| 8,313,032 | B2 | 11/2012 | Fjellstad et al. | |
| 2007/0133882 | A1 * | 6/2007 | Matsuno | 382/209 |
| 2012/0072258 | A1 * | 3/2012 | Hull et al. | 705/7.27 |

OTHER PUBLICATIONS

Android Malware Spreads Through QR Code, Oct. 2011, McAfee Labs, 8 pages.
Toying with Barcodes, Phenoelit, Dec. 2007, 57 pages.
Smart-Scan UID Scanner, ID Integration, Jan. 2013, 3 pages.
Crazy Square Barcodes can point your phone to Malware, John Leyden, The Register, Oct. 2011, 4 pages.
ID Integration presentation, Smart-Scan Technology, 2008, 13 pages.
Image Uploader Software Guide, Jul. 1, 2004, 2 pages.
Code Corp Image Capture, Dec. 5, 2006, 3 pages.
ID Product Profile, Smart-Scan Technology, Feb. 19, 2010, 2 pages.
There's more value in a bar code, Jan. 15, 2013, 3 pages.

* cited by examiner

*Primary Examiner* — Nicholas Giles
(74) *Attorney, Agent, or Firm* — The Juhasz Law Firm, P.C.

(57) ABSTRACT

A system and method for naming an image file includes an image capture module; a processor; a memory unit; an interface; a coded image trigger mechanism for initiating capture of a coded image; and a photo trigger mechanism for initiating capture of one or more photo image(s). The image capture module including a decode module, a photo module, a photo file renaming module. The decode module decodes the captured image from the coded image trigger and generates an encoded ASCII character data string. The photo module stores the captured photo image(s) as file(s) with an auto root name on the system device memory. The photo file renaming module renames the image file(s) created by the photo trigger to a new root name which is defined by a trailing use of the code trigger or manual keypad entry.

29 Claims, 6 Drawing Sheets

| Size | Filename | Image1 | Image2 | Image3 |
|---|---|---|---|---|
| 130 KB<br>36 KB<br>70 KB | 20077287_1.jpg<br>20077287_2.jpg<br>20077287_3.jpg<br>(Root Filename defined by scan of 2D bar code) | | | |
| 134 KB | camera_1.jpg<br>(Root Filename defined by manual keypad entry) | | | |
| 85 KB<br>53 KB | SALP81677_1.jpg<br>SALP81677_2.jpg<br>(Root Filename defined by scan of 1D bar code) | | | |

*FIG. 5*

SYSTEM AND METHOD FOR NAMING AN IMAGE FILE

RELATED APPLICATION

The present application is a non-provisional of and claims the benefit of U.S. Provisional Application 61/794,593, of the same title, filed on Mar. 15, 2013, which is hereby incorporated by reference in its entirety.

TECHNICAL FIELD

This disclosure is related to image capture and storage device and more particular to devices for capturing and storing digital image files using bar code symbol decode data to automate the image file naming process.

BACKGROUND

The cataloguing of products in service, inventory or transit has traditionally involved abstract electronic databases which record at least one unique characteristic or trait (usually a serial number). The addition of digital images to each database record can greatly enhance the value of the overall database by providing additional concrete evidence of product traits such as "condition," "location," and "unique identifying markings."

All bar code readers which are capable of decoding 2-dimensional bar code symbologies do so with the initial capture of an image. Most bar code reader manufacturers provide means to store and/or transmit these images as digital files which can be read via standard computer software applications.

Yet, few hardware manufacturers provide any type of file naming automation to these stored images. Those that do, appear to be limited to adding simple Time/Date stamps to a static base filename.

SUMMARY OF THE INVENTION

One embodiment disclosed herein is a system for naming an image file includes an image capture module; a processor; a memory unit; an interface; a coded image trigger mechanism for initiating capture of a coded image; and a photo trigger mechanism for initiating capture of one or more photo image(s). The image capture module including a decode module, a photo module, a photo file renaming module. The decode module decodes the captured image from the coded image trigger and generates an encoded ASCII character data string.

The photo module stores the captured photo image(s) as file(s) with an auto root name on the system device memory. The photo file renaming module renames the image file(s) created by the photo trigger to a new root name which is defined by a trailing use of the code trigger or manual keypad entry.

Another embodiment is a method for naming a file image. The method includes steps of a) capturing a first image of an attribute of a target object using a photo trigger, b) processing the first captured image according to a first image format into a first image file, the first image file including a static root name and c), transmitting the first image file to a first memory location. The method d) optionally includes repeating steps a through c for the creation of multiple image files, each sharing the same static root name but with auto incrementing prefix or suffix characters to define filename uniqueness. The method also includes steps of utilizing a separate code trigger mechanism to capture and decode a coded image and generating an ASCII character string of the encoded data, using the decoded character string of (e) to define a new root filename for the single or group of image files previously captured in steps a through d. The method also includes incrementing the new root filename by user defined option to include numeric, alphanumeric, time/date, or other prefix and/or suffix data to provide uniqueness to each captured image file.

There are many other embodiments of systems and methods for the present disclosure.

BRIEF DESCRIPTION OF THE DRAWINGS

FIG. 5 shows the auto serializing of multiple images via an appended suffix to each file name according to this disclosure.

DETAILED DESCRIPTION

A barcode is a printed symbol that connects a physical object to digital data. There are many bar code symbologies in use today. For example, UPC is the standard bar code for items for sale to the public. It is the code seen on items at the local supermarket. UPC-A is a fixed-length, numeric-only bar code. It contains 1 digit for a system number, 5 digits for the manufacturer number, 5 digits for the product number, and one checksum digit. Another code that has become important in product recognition technologies is the 2D barcode. A 2D bar code symbology allows vast amounts of data on a single bar code by storing data in 2 dimensions. A common demonstration of the technology is a single bar code no larger than a standard UPC bar code that contains the entire Gettysburg Address. Some common 2D bar code symbologies include PDF 417, DataMatrix Code, and MaxiCode.

Barcodes provide an effective way to identify, inventory, track product transactions, movements, etc. For example, a 2D barcode can be put on a wide variety of products such as printed materials, packaging, posters, signs, websites, and clothing. The wide use of barcodes can make manual entry of barcode data from each product an unmanageable task. In response, bar code readers were developed to enable scanning of barcodes on products in order to quickly discern the data associated with the product.

The barcode reader, otherwise known as a barcode scanner, is an electronic device for reading barcodes which may be rendered in printed, displayed, or in other ways. The barcode reader typically includes a light source, one or more light sensors, decoder hardware and software, and an output port. The light source emits light to be reflected off a barcode, which in an illustrative example may be a rendered in a printed manner. The light sensors capture and translate the reflected light into electrical signals. The decoder hardware and software transform the barcode image data represented by the electrical signals into an encoded ASCII character data string and provides the coded data to the output port. The output port may be connected to a computer by wire or wireless and the communication link provided by the wire or wireless link provides a data channel between the scanner and the computer for transferring captured and analyzed bar code data to the computer.

Barcode scanners can be classified according to their use. For example, industrial barcode scanners are scanners that may be specifically designed for industrial use. Alternatively, general purpose barcode scanners are scanners that may be provided to computers or mobile terminals to give them bar code scanning functionality. For example, many smart phones may be either provided with embedded barcode scan functionality or may be downloaded with applications that may provide that functionality.

Figure 1:
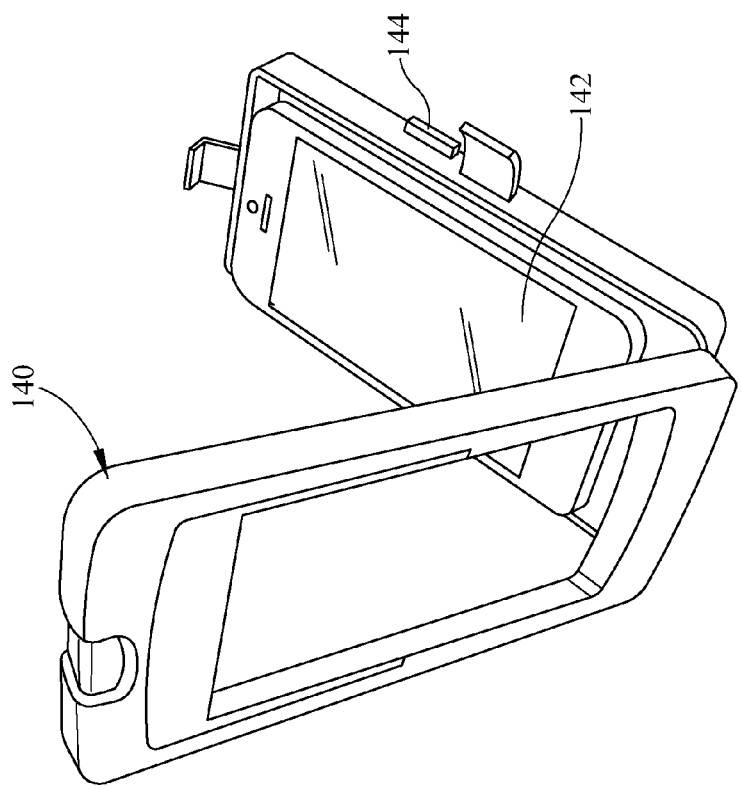
FIG. 1 shows two image capture devices useable with this disclosure.
Figure 1:
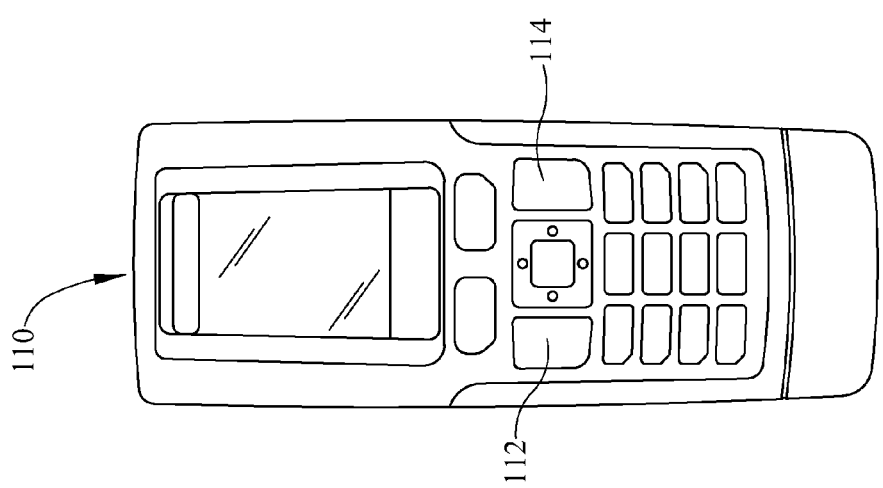

FIG. 1 shows image capture devices 110 and 140. Image capture device 110 is illustratively an industrial grade bar code reader with scanning and/or RFID functionality, or any other industrial grade mobile computing device. Image capture device 140 is illustratively a smart phone. Conventional mobile computing devices include a handheld terminal, a lap top computer, a smart phone, a handheld personal digital assistant (PDA), a wireless mobile phone, a pager, or any other mobile computing device.

Each of the image capture device 110 and the image capture device 140 may illustratively be configured with two or more triggers for performing different functions. Image capture device 110 includes photo-trigger 112 for performing an image capture file store with auto-incrementing generic root filename. In addition, image capture device 110 includes coded-image-trigger 114 for decoding bar code symbology image into an ASCII character string. Similarly, image capture device 140 includes photo-trigger 142 for performing an image capture file store with auto-incrementing generic root filename. In addition, mobile terminal 140 includes coded-image-trigger 144 for decoding bar code symbology image into an ASCII character string.

Figure 2:
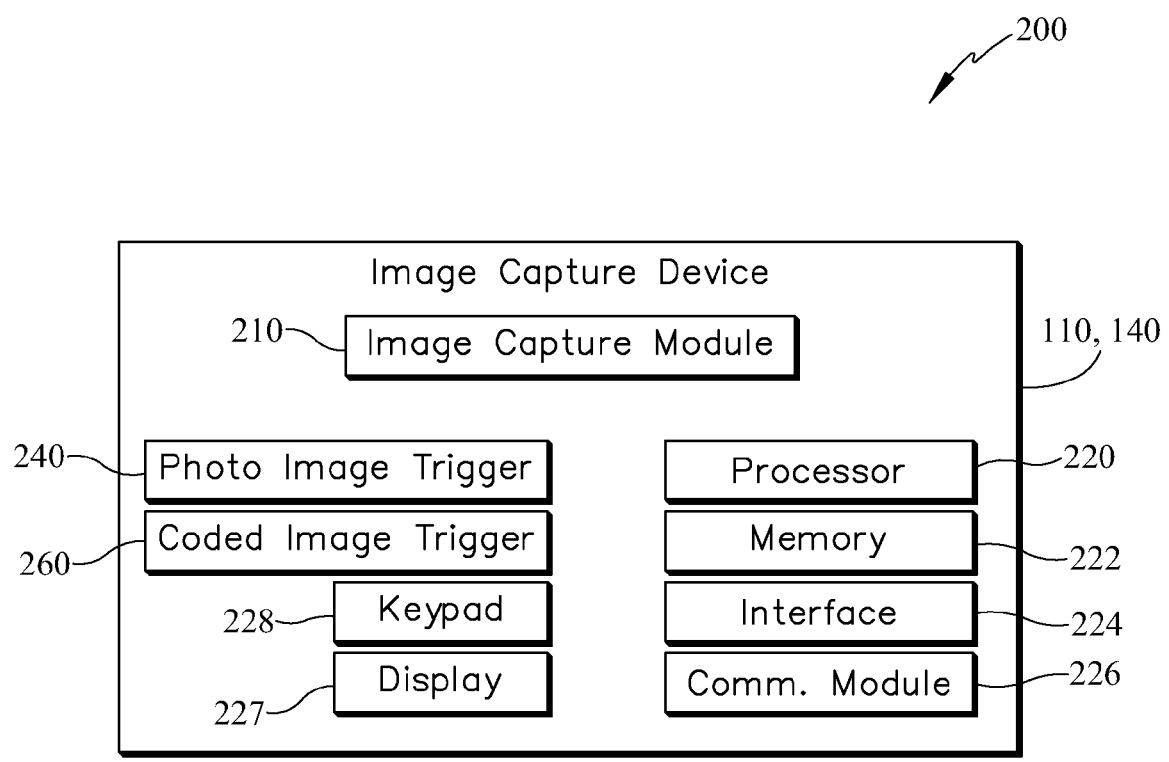
FIG. 2 shows an image capture device of this disclosure.

FIG. 2 shows an illustrative configuration for each of the image capture devices 110, 140. Image capture devices 110 and 140 illustratively comprise a processor 220, a memory unit 222, an interface 224, a communication module 226, a keypad 227, a display 228, a photo image trigger 240, and a coded image trigger 260.

Processor 220 may be implemented in any number of ways. Such ways include, by way of example and not of limitation, digital and/or analog processors such as microprocessors and digital-signal processors (DSPs); controllers such as microcontrollers; software running in a machine; programmable circuits such as Field Programmable Gate Arrays (FPGAs), Field-Programmable Analog Arrays (FPAAs), Programmable Logic Devices (PLDs), Application Specific Integrated Circuits (ASICs), any combination of one or more of these, and so on.

Memory unit 222 may be implemented in any number of ways. Such ways include, by way of example and not of limitation, nonvolatile memories (NVM), read-only memories (ROM), random access memories (RAM), any combination of these, etc. Memory 222 may include programs containing instructions for execution by processor 220. The programs provide instructions for execution by the processor 220, and can also include instructions regarding protocols and decision making analytics, etc. that can be used by the image capture device 110, 140. In addition, memory 222 can store rules, configurations, data, etc.

Interface 224 is hardware and software configured to provide electrical interfacing between the processor, the memory, the communication module, the keypad, the display, the photo image trigger, the coded image trigger, and the image capture module can be made in any number of ways. For example, interface 224 may include a screen, to display a parameter of a patient that is detected and measured, provide visual feedback to the rescuer for their resuscitation attempts, and so on. Interface 224 may also include a speaker, to issue voice prompts, etc. Interface 224 may additionally include various controls, such as pushbuttons, keyboards, and so on. In addition, interface 224 can be controlled by processor 220, or directly by the user display 227, keypad, 228, and so on.

Communication module 226 is hardware and software configured to transmit data to and from the image capture device. In an illustrative embodiment, the communication module 226 may include a wireless module and/or a hardwire connect module. The wireless module may illustratively be a Wi-Fi module. Additionally or alternatively, the wireless module may be a blue tooth module, a CDMA module, or any other communication module that enables a wireless communication link for the bidirectional flow of data between the image capture device and an external device. The hardwire connect module may be a hardware and software based data connector configured to connect with a data outlet of an external device such as a computer. The hardwire connect module may be one or more ports and associated circuitry and software that allow bidirectional flow of data between the image capture device and the device. Illustratively, the hardwire connect module may be an Ethernet connector, an RS232 connector, a USB or other wire connector. Other connectors and hardware and software configurable for providing a wireless and wired connection between the communication module 226 and the external device may be used for image capture device 110, 140 as are well known in the art.

Keypad 228 can be made in any number of ways. For example, keypad 228 may include various controls, such as pushbuttons, keyboards, and so on for manual entry of data into the image capture device.

Display 227 may be a visual display capable of displaying data transmitted from processor 220. Displays for use with this disclosure may include an LCD or LED screen, an e-paper display, or other bi-stable display, a CRT display or any other type of visual display.

Photo image trigger 240 may illustratively be a lever or button pushed by the finger or by some other external mechanism to activate a function for capturing a photo image. However, photo image trigger is not limited to a finger or other external activation. More broadly speaking, photo image trigger may also be located internally to the image capture device such as a circuit that initiates the action of capturing a photo image. Hence, triggers may be external triggers or internal triggers depending on the design.

Coded image trigger 260 may illustratively be a lever or button pushed by the finger or by some other external mechanism to activate a function for capturing a coded image. However, coded image trigger is not limited to a finger or other external activation. More broadly speaking, coded image trigger may also be located internally to the image capture device such as a circuit that initiates the action of capturing a coded image. Hence, triggers may be external triggers or internal triggers depending on the design.

Figure 3:
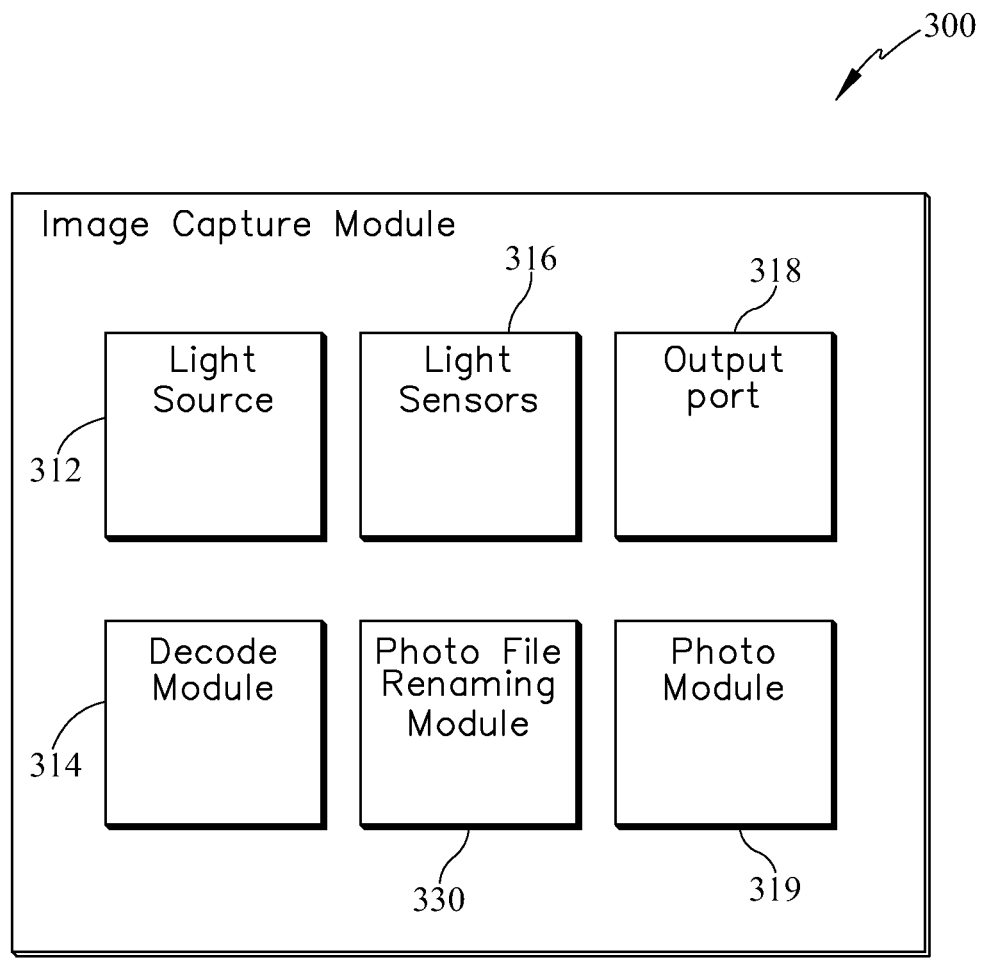
FIG. 3 shows an image capture module of the image capture device of FIG. 2.

FIG. 3 shows an image capture module 300 of the image capture device 200 of FIG. 2. Image capture module 300 typically includes a light source 312, one or more light sensors 316, a decode module 314, a photo module 319, a photo file renaming module 330, and an output port 318. The light source 312 emits light to be reflected off an object. The light sensors 316 capture and translate the reflected light into electrical signals. If the coded image trigger 260 is activated indicating the image captured includes a barcode, the decode module 314 transforms the barcode image data represented by the electrical signals into an encoded ASCII character data string and provides the coded data to the output port 318. If the photo image trigger 240 is activated indicating the image captured is a photo image, the photo module 319 transforms the photo image data represented by the electrical signals into image(s) file(s) and may either store the image file(s) with an auto root name on the system device memory, or send that/those image file(s) directly through the output port 318. The output port may be connected to the processor 220 of the image capture device (110, 140) by wire, and the communication link provided by the wire link provides a data channel between the output port and the processor for transferring captured and transformed captured bar code data or captured photo image to the processor.

Advantageously, photo file renaming module 330 is hardware and software configured to initiate a file renaming process using the decoded character string of the captured code data as the new root filename for the stored image files. In particular, the photo file renaming module is configured to rename the image file(s) created by the photo to a new root name which is illustratively defined by a trailing use of the coded trigger but may also be defined by a manual keypad entry. In other words, the photo file renaming module illustratively uses the value of the bar code that was read as the name of the image file(s). Alternatively, the photo file renaming module may rename these files using characters that the user manually enters via the keypad 228. In addition, each new root name may be auto incremented by the photo file renaming module with a trailing suffix to support multiple image captures with the same root name.

Figure 4A:
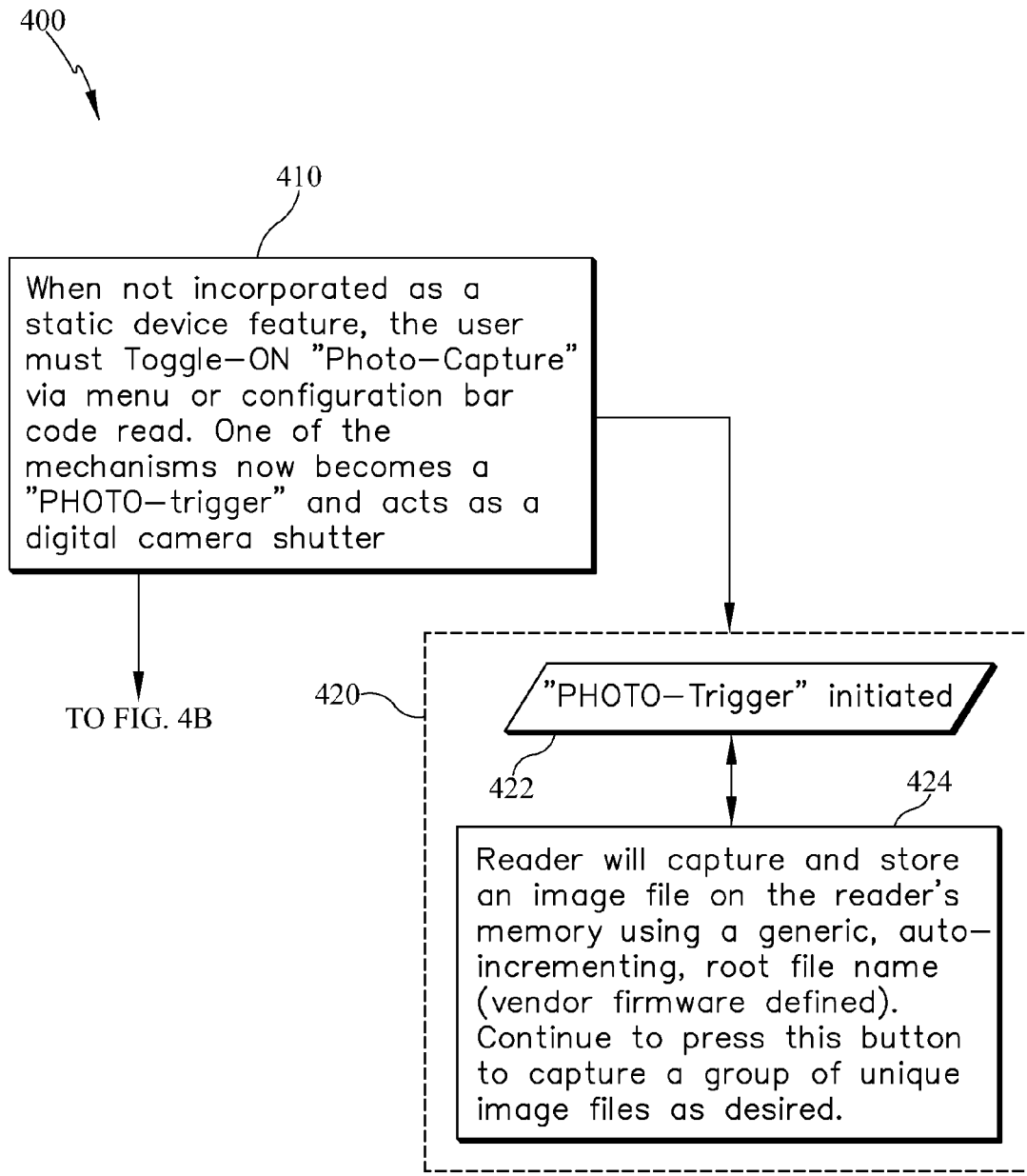
FIGS. 4A-4B depict a process for renaming photo images according to this disclosure.
Figure 4B:
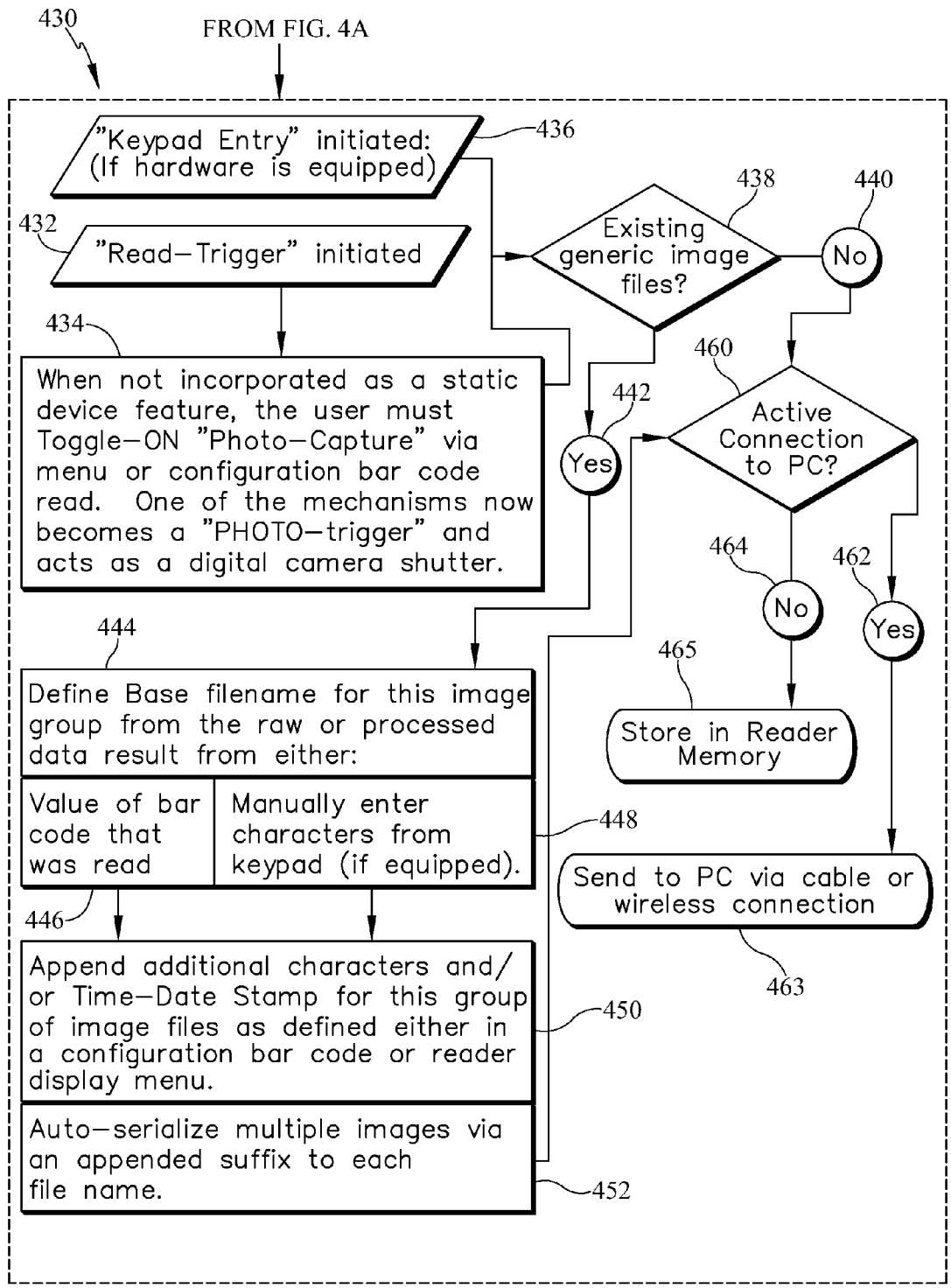

FIGS. 4A-4B depict an illustrative process of this disclosure. As shown in FIG. 4A at step 410, the user activates the photo trigger mode of operation. The trigger activated may be a dedicated trigger on the image capture device or may be a software trigger activated by navigation of a displayed menu to the trigger. At step 420, the photo trigger mode of operation is active. At step 422, the user activates the photo trigger. At step 424, the image capture device captures and stores an image on the memory unit of the image capture device using a generic, auto-incrementing, root file name, illustratively vendor defined. The user continues to activate the photo trigger to capture a group of unique images files as desired.

Once the photo images have been captured, the user returns to step 410 and activates the code trigger mode of operation. The trigger activated may be a dedicated trigger on the image capture device or may be a software trigger activated by navigation of a displayed menu to the trigger. As shown in FIG. 4B at step 430, the code trigger mode of operation is active. At step 432, the user scans a barcode; attempting to decode a bar code symbology within the field of view of the sensors of the image capture device. If successful, a decoded ASCII character string is defined at step 434 and stored in a buffer and/or permanent memory (e.g., memory 222 shown in FIG. 2). As an alternative to step 432, the user may pursue step 436 by manually entering a character string via a keypad (if supplied). At step 438, the photo file renaming module 330 shown in FIG. 3 determines whether any existing image files with generic root names exist.

If there is (are) no existing image file(s) at step 438, then the image capture device advances along path 440 to step 460 to determine whether the image capture device is connected to a computer. If it is connected, then the image capture device advances along path 462 to step 463 where the image capture device sends the stored ASCII decode (or manual user input) data string to the computer. If the image capture device is not connected to the computer, the image capture device will advance along path 464 and store the ASCII decode (or manual user input) data string to the memory unit 222 in the image capture device.

If at step 438, the photo file renaming module determines that there are existing image files with generic root name(s), the photo file renaming module advances along path 442 to define a base file name for this image file group. The base file name may be either the value of the bar code that was read in step 434, as indicated at step 446, or if keypad equipped—the manually entered characters in step 436, as indicated at step 448. At step 450 the photo file renaming module may add, as a prefix and/or suffix, additional phraseology and/or a time date stamp for this group of image files as defined by the user either in a scanned configuration bar code or a reader display menu selection. At step 452, the photo file renaming module auto-serializes multiple images by appending a unique numeric or alphanumeric suffix to each file name. The photo file renaming module then advances to step 460 where it determines whether the image capture device is connected to a computer and proceeds accordingly as previously described.

The step 452 auto-serializing of multiple images via an appended suffix is illustratively shown in FIG. 5. FIG. 5 shows several photo image groups 510, 520, 530 that have been captured by the image capture device. As shown in FIG. 5, each group of images bears the same root name. To differentiate between images, the photo file renaming module of this disclosure advantageously appends the first image filename of each group with the suffix_1, the second image filename of each group with the suffix_2, and so forth through to the last image filename of each group.

There is thus provided a system for naming an image file comprising: an image capture module; a processor; a memory unit; an interface; a coded mage trigger mechanism for initiating capture of a coded image and a photo trigger mechanism for initiating capture of one or more photo image(s). The image capture module includes a decode module to decode the captured image from the coded image trigger and generates an encoded ASCII character data string; a photo module for storing the captured photo image(s) as file(s) with an auto root name on the system device memory; and a file renaming module for renaming the image file(s) created by the photo trigger to a new root name which is defined by a trailing use of the code trigger or manual keypad entry. In some embodiments, each new root name is auto incremented with a trailing suffix to support multiple image captures with the same root name.

The image that is coded may be a bar code or OCR text string, and its encoded value, as captured by the code trigger, may define the root name of the 'photo' image file(s) that is(are) captured by the image capture module via the photo trigger'. The code trigger and photo trigger mechanisms may be functionally distinct from one another, and can be of (but not limited to) a mechanical, electromechanical, voice or gesture activated nature. The system may include an image capture device. The image capture device is an image capture device taken from the group of image capture devices consisting of a bar code reader, a mobile terminal, cellular telephone device, and/or a computer. The image capture device may be a bar code reader and the image capture of the coded image and of the photo image are taken along the same optical path.

The data buffer and image file memory locations may be located on the image capture device. The image capture module is located on the image capture device, the image capture device may be connected to a network, and the data buffer and image file memory locations are located on a computer in the network. The image capture device may further include a communication module, the image capture device being connected to the network through the communication module. The communication module may enable wireless communication between the image capture device and the network. The computer on the network may be a server.

A method for naming an image file comprises the steps of: capturing a first image of an attribute of a target object using a photo trigger; processing the first captured image according to a first image format into a first image file, the first image file including a static root name; transmitting the first image file to a first memory location; optionally repeating the above steps for the creation of multiple image files, each sharing the same static root name but with auto incrementing prefix or suffix characters to define filename uniqueness; utilizing a separate code trigger mechanism to capture and decode a coded image and generating an ASCII character string of the encoded data, using the decoded character string of to define a new root filename for the single or group of image files previously captured; and incrementing the new root filename by user defined option to include numeric, alphanumeric, time/date, or other prefix and/or suffix data to provide uniqueness to each captured image file.

The image captured by the code trigger may be a coded image and that image format is a 1-D or 2-D coded image format. The image(s) captured by the 'PHOTO trigger' is a (are) photo image(s) which uses (use) an image format using lossless data compression algorithms. The image(s) captured by the image trigger may be photo image(s) which uses (use) an image format using lossy data compression algorithms. The image(s) captured by the photo trigger may be photo image(s) which uses (use) an image format using a raster format, an HDR raster format, an HDR-raster format, a vector format, a compound format, or a stereo format. The raster format may be a raster format selected from the group consisting of JPEG, TIFF, RAW, GIF, MBP, PNG, PPM, PAM, and WEBP formats. The HDR raster format may be taken from the group consisting of RGBE, TIFF, and IFF-RGFX formats. The vector format may be taken from the group consisting of CGM, Gerber format, SVG, other 2D vector formats, and 3D vector formats. The stereo format may be a stereo format taken from the group consisting of MPO, PNS, and JPS formats.

The attribute captured by the 'READ trigger' of the target object may be either a raw, filtered, or processed ASCII data string. The attributes captured in the image files by the photo trigger may consist of a picture containing identification information on the target object, a picture of a product identification nameplate plate, or a picture of a product represented by the target object. The attributes captured in the image files by the photo trigger may consist of a picture of the product, a picture of the facility from where the product is located at the time of the taking of the picture, and a picture of the recorded history on the product. The recorded history on the product is the recorded history on the product may be taken from the group of recorded history consisting of inventory history of the product, maintenance history of the product, tracking history of the product, distribution history of the product, uses of the product, and commentary history on the product.

The data captured via the code trigger may be captured by an image capture device selected from the group of consisting of barcode readers, RFID readers and mobile devices including an image capture device. The image file(s) captured by the photo trigger may be captured by an image capture device selected from the group consisting of barcode readers, RFID readers and mobile devices including an image capture device. The data captured by the code trigger and the image file(s) captured by the photo trigger are captured by an image capture device selected from the group consisting of barcode readers, RFID readers and mobile devices including an image capture device. The image capture device which incorporates the code trigger and the image capture device which incorporates the photo trigger may be the same image capture device.

What is claimed is:

1. A system for naming an image file comprising:
an image capture module;
a processor;
a memory unit;
an interface;
a code image trigger circuit for initiating capture of at least one code image;
a photo trigger circuit for initiating capture of at least one photo image;
the image capture module including:
 a decode hardware and software configured to decode the code image and generate a character data string;
 a photo hardware and software configured for storing the at least one photo image as an image file with an automatically assigned root name; and
 a file renaming hardware and software configured for renaming the at least one image file with a new root name which is defined by a trailing use of the code image trigger circuit or manual keypad entry.

2. The system of claim 1, wherein each new name is auto incremented with at least one of a trailing suffix and a preceding prefix to support multiple image captures with the same name.

3. The system of claim 1, wherein the at least one code image comprises a bar code or OCR text string, and its encoded value, as captured by the code image trigger circuit, defines the root name of the image file that is captured by the image capture module via the photo trigger circuit.

4. The system of claim 1 wherein the code image trigger circuit and the photo trigger circuit are functionally distinct from one another, and can be activated by a trigger that is at least one of a mechanical, electromechanical, voice-activated and gesture-activated.

5. The system of claim 1 wherein the system includes an image capture device.

6. The system of claim 5, wherein the image capture device is an image capture device taken from the group of image capture devices consisting of a bar code reader, a mobile terminal, cellular telephone device and a computer.

7. The system of claim 5, wherein the image capture device comprises a bar code reader and a single optical path provides for capture of the at least one code image and the at least one photo image.

8. The system of claim 5, wherein the image capture device comprises at least one of a data buffer and an image file memory.

9. The system of claim 5, wherein the image capture module is located on the image capture device, the image capture device is configured for communication with a network comprising a remote computer, the remote computer comprising at least one of a data buffer and an image file memory locations.

10. The system of claim 9, wherein the image capture device further includes a communication module, the image capture device being configured for communication with the network through the communication module.

11. The system of claim 10, wherein the communication module is configured to enable wireless communication between the image capture device and the network.

12. The system of claim 9, wherein the remote computer comprises a server.

13. A method for naming an image file, the method comprising:
   a. capturing an image of an attribute of a target object;
   b. processing the captured image into an image file, the image file including a static root name;
   c. transmitting the image file to an associated memory location;
   d. optionally repeating steps (a) through (c) for the creation of additional image files, each image file sharing the same static root name but with auto incrementing prefix or suffix characters to define filename uniqueness;
   e. capturing and decoding a code image and generating a character string;
   f. using the character string of step (e) to define a new root filename for at least one image file previously captured in steps a through d; and
   g. incrementing the new root filename by a user defined option to include numeric, alphanumeric, time/date, or other prefix and/or suffix data to provide uniqueness to each image file.

14. The method of claim 13, wherein a format for the code image comprises one of a 1-D and a 2-D format.

15. The method of claim 13, wherein the at least one image file comprises a photo image which uses an image format using a lossless data compression algorithm.

16. The method of claim 13, wherein the at least one image file comprises a photo image which uses an image format using a lossy data compression algorithm.

17. The method of claim 13, wherein the at least one image file comprises a photo image which uses an image format using comprising one of a raster format, an HDR raster format, a vector format, a compound format, and a stereo format.

18. The method of claim 17 wherein the raster format is a raster format taken from the group consisting of JPEG, TIFF, RAW, GIF, MBP, PNG, PPM, PAM, and WEBP formats.

19. The method of claim 17 wherein the HDR raster format is taken from the group consisting of RGBE, TIFF, and IFF-RGFX formats.

20. The method of claim 17 wherein the vector format is taken from the group consisting of CGM, Gerber format, SVG, other 2D vector formats, and 3D vector formats.

21. The method of claim 17 wherein the stereo format is a stereo format taken from the group consisting of MPO, PNS, and JPS formats.

22. The method of claim 13, wherein the attribute of the target object is one of a raw, a filtered, and a processed ASCII data string.

23. The method of claim 13, wherein the attribute comprises at least one of identification information on the target object, a product identification name plate, and a product represented by the target.

24. The method of claim 13, wherein the attribute comprises at least one of a picture of the object, a picture of a facility where the object was located at a time of taking of the picture, and a picture of a recorded history on the object.

25. The method of claim 24, wherein the recorded history on the object is the recorded history on the object taken from the group of recorded history consisting of inventory history of the object, maintenance history of the object, tracking history of the object, distribution history of the object, uses of the object, and a commentary history regarding the object.

26. The method of claim 13, wherein the code image is captured by an image capture device selected from the group consisting of barcode readers, RFID readers and mobile devices including an image capture device.

27. The method of claim 13, wherein at least one of the image files is captured by an image capture device selected from the group consisting of barcode readers, RFID readers and mobile devices including an image capture device.

28. The method of claim 13, wherein the code image is captured by an image capture device selected from the group consisting of barcode readers, RFID readers and mobile devices including an image capture device.

29. The method of claim 28, wherein a single image capture device is used to provide the code image and the at least one image file.

* * * * *